(12) United States Patent
Feilner

(10) Patent No.: US 8,974,583 B2
(45) Date of Patent: Mar. 10, 2015

(54) SWIRL ELEMENT, INLET VALVE, DEVICE AND METHOD FOR EVAPORATING OR DRIVING OUT HIGHLY VOLATILE

(75) Inventor: Roland Feilner, Regensburg (DE)

(73) Assignee: Krones AG, Neutraubling (DE)

( * ) Notice: Subject to any disclaimer, the term of this patent is extended or adjusted under 35 U.S.C. 154(b) by 189 days.

(21) Appl. No.: 13/394,723

(22) PCT Filed: Sep. 7, 2010

(86) PCT No.: PCT/EP2010/005483
§ 371 (c)(1),
(2), (4) Date: Mar. 7, 2012

(87) PCT Pub. No.: WO2011/029571
PCT Pub. Date: Mar. 17, 2011

(65) Prior Publication Data
US 2012/0167991 A1    Jul. 5, 2012

(30) Foreign Application Priority Data
Sep. 11, 2009  (DE) .......................... 10 2009 040962

(51) Int. Cl.
*B01D 19/00* (2006.01)
*C12C 13/00* (2006.01)
*C12H 1/16* (2006.01)

(52) U.S. Cl.
CPC ............ *C12C 13/00* (2013.01); *B01D 19/0057* (2013.01); *C12H 1/16* (2013.01)
USPC .............................................. 96/204; 96/216

(58) Field of Classification Search
USPC ................ 96/204, 208, 216; 99/278
See application file for complete search history.

(56) References Cited

U.S. PATENT DOCUMENTS 4,415,275 A * 11/1983 Dietrich ...................... 366/165.1
6,036,749 A    3/2000 Ribeiro et al.
(Continued)

FOREIGN PATENT DOCUMENTS

DE        29722673 U1   3/1998
DE   10 2008 050494 A1   4/2009
(Continued)

OTHER PUBLICATIONS

International Preliminary Report on Patentability corresponding to PCT Application PCT/EP2010/005483, issued on Mar. 13, 2012 (21 pages).

(Continued)

*Primary Examiner* — Robert A Hopkins
(74) *Attorney, Agent, or Firm* — Wolff & Samson PC

(57) ABSTRACT

A swirl element is provided for an inlet valve of a brewing vessel for introducing a liquid, in particular a mash, a wort, a yeast suspension, a sparge water or the like into the brewing vessel, in particular into a mash tun, a mash vat, a combined mash/wort tun, a combined mash/wort/stripping tun, a wort tun, a combined whirlpool tun, a whirlpool, a clarifying device, an evaporating vessel or the like, comprising at least one flow-directing element by means of which an angular momentum can be imparted to the liquid flowing through the inlet valve. An evaporating device comprises a brewing vessel, also for evaporating highly volatile substances/gases, in particular highly volatile flavor substances, DMS, carbon dioxide, oxygen or the like from the aforementioned liquids. The brewing vessel comprises the swirl element and/or an inlet valve admitting the liquid. A brewing process evaporates highly volatile substances/gases from the aforementioned liquids.

6 Claims, 12 Drawing Sheets

(56) References Cited

U.S. PATENT DOCUMENTS

| | | | |
|---|---|---|---|
| 8,337,603 B2 * | 12/2012 | Akhras et al. | 96/184 |
| 2013/0089649 A1 * | 4/2013 | Feilner et al. | 426/475 |

FOREIGN PATENT DOCUMENTS

| | | |
|---|---|---|
| EP | 1 443 026 A1 | 8/2004 |
| EP | 2 140 920 A2 | 1/2010 |
| GB | 1 247 126 | 9/1971 |
| JP | 2003164706 A | 6/2003 |

OTHER PUBLICATIONS

International Preliminary Report of Patentability, dated Mar. 22, 2012, corresponding to PCT Application PCT/EP2010/005483, international filing date Sep. 7, 2010 (8 pages).

PCT International Search Report and English Translation corresponding to PCT Application PCT/EP2010/005483 mailed on Feb. 9, 2011 (7 pages).

* cited by examiner

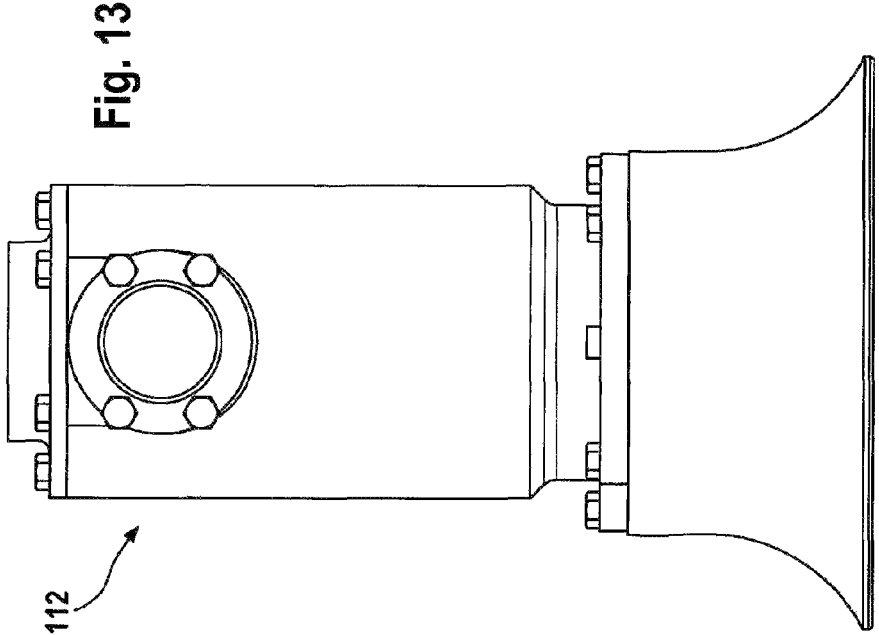
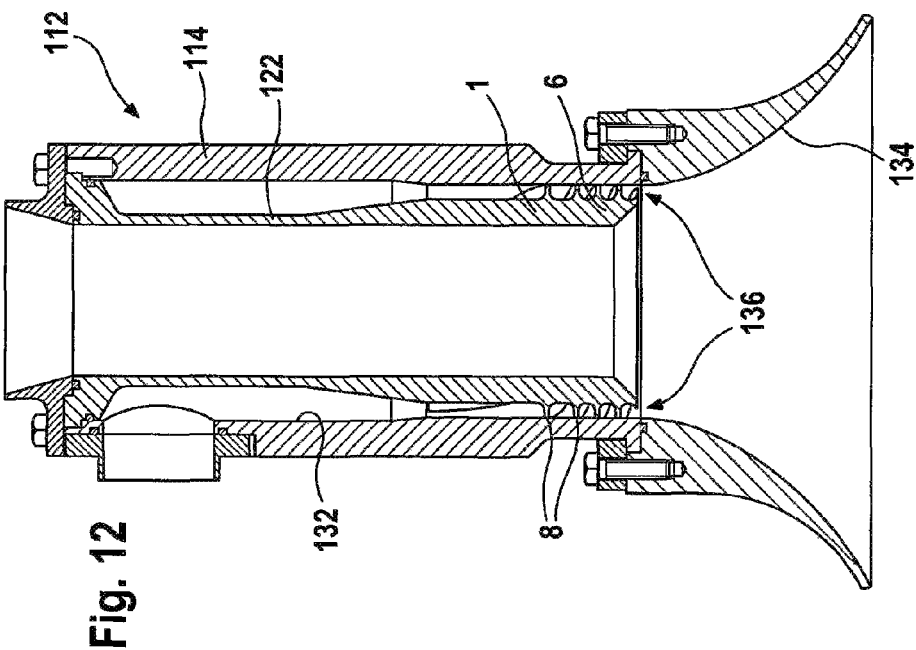

SWIRL ELEMENT, INLET VALVE, DEVICE AND METHOD FOR EVAPORATING OR DRIVING OUT HIGHLY VOLATILE

CROSS REFERENCE TO RELATED APPLICATIONS

This application is a U.S. national stage filing under 35 U.S.C. 371 of International Patent Application No. PCT/EP2010/005483, filed on Sep. 7, 2010, which claims priority to DE 10 2009 040 962.9, filed on Sep. 11, 2009, both of which are herein incorporated by reference in their entirety.

BACKGROUND OF THE INVENTION

The invention relates to a swirl element for an inlet valve of a brewing vessel for introducing a liquid into the brewing vessel, and more specifically to a swirl element, inlet valve, device and method for evaporating or driving out highly volatile substances or gases from liquids, and the use of the same in brewing processes.

Degassing of liquids such as, e.g., liquid foods, in particular beverages, traditionally takes place inside a degassing device. Here the liquid is subjected to a reduced absolute pressure, often in combination with a temperature raised above room temperature. In order to achieve degassing of the liquid that is as complete as possible, it is necessary to expose all the volume elements of the liquid to the conditions named in the foregoing. To this end, the liquid is introduced into the degassing device either by spraying or in the form of a thin film.

In document JP 2003-164706 a degassing device is proposed wherein the liquid to be degassed is introduced into a tank-type degassing vessel vertically from above and coaxially with the center axis. A reduced absolute pressure is present inside the degassing vessel. In detail, feeding takes place through an inlet valve arranged in the upper area of the degassing vessel. The liquid enters from the inlet valve into the degassing vessel through a fixedly pre-set annular gap. In the opened condition of the inlet valve, the annular gap is delimited by a valve seat and a valve cone. The valve seat is the lower end portion of the inlet valve housing. The valve cone is adapted to be driven by a control means so as to allow the realization of two valve conditions, namely, a fully opened valve condition and a fully closed valve condition.

When the liquid passes through the annular gap in the opened condition of the inlet valve, the liquid flows across the valve cone into the degassing vessel. The valve cone is configured in the shape of an umbrella having an enlarged diameter in comparison with the inlet valve and sloping down outwardly in a radial direction from the center axis of the inlet valve which is arranged to be coaxial with the center axis of the degassing vessel. The liquid flowing out ideally forms a thin film on the valve cone, with the film detaching at the edge terminating the cone. The freely dropping liquid film then impinges on the inner wall of the degassing vessel and runs off vertically in a downward direction.

From document DE 297 22 673 U1 a device for degassing sensitive foods having a viscous consistency is known, wherein a rotating, cone-shaped disk for creating a thin liquid film is proposed. The diameter of the rotating disk approximately corresponds to the internal diameter of the degassing vessel, with a narrow, annular gap being formed between disk rim and container wall. During the degassing process, the viscous liquid exits through the annular gap and is then distributed on the disk owing to the shear forces acting as a result of the rotating movement. The centrifuging effect of the rotating cone disk brought about by the shear forces thins the liquid layer while forming a flowing film. Across the entire distance from the inlet valve to the disk rim near the container wall, the liquid film is in surface contact on the upper peripheral surface of the disk.

The use of a conventional inlet valve with formation of a liquid film through radial deflection of the flow of liquid on a valve cone is a drawback inasmuch as a film or umbrella-shape formation that is sub-optimal with regard to the removal of gases from the liquid may come about when degassing different liquids and/or under variable marginal physical conditions. When different liquids or liquids of variable composition are introduced into the degassing device with a same inlet device, the different rheological or flow characteristics of the liquids may result in the formation of variously shaped liquid films that will ultimately differ from the film shape that is optimum for degassing. Aside from the physical marginal conditions, the rheological properties and the flow characteristics of a liquid are essentially determined by its composition. The composition is in turn determined by the solvent, in the practical case particularly water or oil, and by the quantity and kind of the dissolved ingredients. In the case of suspensions, the solids content moreover has an influence on the flow properties.

Another drawback of a conventional inlet valve is that a constant volumetric flow rate of the liquid flowing into the degassing device is a precondition for the formation of a liquid film having an optimum thickness. Due to external influences, in particular influences of units arranged upstream or downstream in a continuous production or processing process, however, fluctuations may occur in the volumetric flow rate of the liquid during degassing. A volumetric flow rate differing from the originally projected target value does, however, result in the formation of a liquid film that is not optimum with a view to degassing, and thus in a deficient degassing result.

Besides the deficient degassing results, deviations from the optimum liquid film during the degassing process may also result in increased frothing of the liquid. This may occur in particular if the liquid film impinges on the inner wall of the degassing vessel at an unfavorable, sufficiently steep angle. If frothing inside the degassing vessel attains an intensity where the froth rises to the evacuation mechanism—which is frequently integrated coaxially in the inlet valve—an irregularity of the degassing process and in a given case of the entire production process may occur.

Utilization of a cone disk with a liquid film in surface contact thereon additionally involves complex mounting of an additional component occupying a large space. Furthermore the proposed cone disk requires a complex mount and a mechanically complicated drive mechanism for the rotation of the cone disk. Furthermore, a degassing device having such installations is difficult to clean, which is a drawback particularly in the degassing of liquid foods.

Furthermore it was hitherto not possible to utilize the part of an inner surface in the upper part of the degassing vessel, which was situated above the impact surface of the liquid film, as a degassing surface. This was a limitation to the usable degassing surface, which resulted in an insufficient removal of gas and in larger-sized containers.

Furthermore, in the conventional brewing process liquids such as mash or wort were introduced into a brewing vessel in the form of a pipe flow having a smallest possible surface-to-volume ratio in order to avoid oxygen adsorption. In order to further reduce the introduction of oxygen, the liquid was moreover introduced into the brewing vessel from the vessel's bottom in a direction opposite to gravity. This did, however, only result in a poor effect of evaporating undesirable, highly volatile substances such as certain flavor substances.

SUMMARY OF THE INVENTION

The invention is therefore based on the object of providing at least one swirl element for an inlet valve of a degassing device for introducing a liquid into the degassing device, a like inlet valve, an evaporation device comprising a brewing vessel also for evaporating and/or expulsing highly volatile substances from liquids, to thereby obtain an introduction of a liquid, in particular of a mash, a wort, a yeast suspension, a sparge water, a last wort or the like into the brewing device, that subjects products to a mild treatment particularly with little frothing while forming an optimum liquid film even with varying liquid compositions and/or volumetric flow rates.

In terms of device technology, this object is achieved through the swirl element for an inlet valve of a brewing vessel for introducing a liquid into the brewing vessel having the features of claim 1, through the inlet valve for introducing a liquid into the brewing vessel having the features of claim 4, and through the evaporating device for evaporating and/or expulsing highly volatile substances or gases from liquids having the features of claim 7.

In terms of process technology, the object named in the foregoing is moreover achieved through the method for evaporating and/or expulsing highly volatile substances or gases from liquids having the features of claim 8.

Moreover, in terms of use the aforementioned object is achieved through the use of the swirl element in a brewing process for evaporating and/or expulsing highly volatile substances or gases from liquids having the features of claim 10.

In accordance with the invention, what is proposed for the first time is a swirl element for an inlet valve of a brewing vessel for introducing a liquid, in particular a mash, a wort, a yeast suspension, a sparge water, a last wort, a blending water or the like into the brewing vessel, in particular into a mash tun, a mash vat, a combined mash/wort tun, a combined mash/wort/stripping tun, a wort tun, a combined whirlpool tun, a whirlpool, a clarifying device, an evaporating vessel, a yeast tank or the like, which comprises at least one flow-directing element, wherein it is possible to impart an angular momentum to the liquid flowing through the inlet valve.

In accordance with the invention, the use of a swirl element for an inlet valve is thus proposed for the first time, wherein an angular momentum is imparted to the inflowing liquid through interaction with the at least one flow-directing element so as to present a spin. The generation of the angular momentum results in a tangential acceleration of the flowing liquid, which generates an additional component of movement in a substantially radial direction. The angular momentum causes the liquid to detach from the swirl element while forming a liquid film or umbrella shape.

Here it is advantageous that the liquid film exhibits properties that are optimal for evaporating and/or degassing, in particular an optimum film thickness. As a result of the optimum evaporating and/or degassing properties of the produced liquid film it is possible to ensure a sufficient removal of substances from the liquid.

The tangential acceleration of the liquid film furthermore for the first time brings about a direct application of the liquid film against an inner surface of the inlet valve or of the brewing vessel. Thus it is for the first time possible to use substantially the entire inner surface of the brewing vessel as an evaporating and/or degassing surface.

Owing to the direct application of the liquid film against the inner surface and the close contact of the liquid film while running off on the inner surface, frothing of the liquid to be degassed may be reduced further.

Imparting an angular momentum to a liquid flowing through the swirl element furthermore makes it possible for the first time to produce a liquid film having an optimum thickness, even with a varying volumetric flow rate. Thus, e.g., the flow velocity inside the inlet valve is increased when the volumetric flow rate increases, with the angular velocity of the liquid equally increasing due to the interaction of the liquid with the at least one flow-directing element. This in turn increases the radial velocity component, so that a liquid film having an unchanging and optimum thickness is formed despite the higher volumetric flow rate. In accordance with the invention, active control of the film formation process is therefore not necessary.

Moreover, due to the swirl element according to the invention only minor shear forces act on the flowing liquid, with the liquid to be evaporated and/or degassed thus being subjected to a mild treatment and its quality being preserved.

Moreover, conventional inlet valves and/or brewing vessels or evaporating devices may be retrofitted with the swirl element according to the invention, so that the advantages of the invention may be obtained through minimum expenditure in terms of costs and assembly.

The use of the swirl element according to the invention allows to evaporate highly volatile substances from a liquid or a suspension in a gentle and efficient manner. A highly volatile substance presently is understood to be a flavor component or the like such as, e.g., dimethyl sulfide (DMS), its precursor substance (DMS-P), as may be contained in particular in a mash, a wort, or the like. Gaseous substances are in particular understood to be carbon dioxide, oxygen, air or the like. A liquid is understood to be in particular a mash, a wort, a yeast suspension, a sparge water, a last wort, a blending water, a beer or the like.

In particular, forming a liquid film and applying it to the inner surface of the inlet valve and of the brewing vessel enlarges the surface being utilized for evaporation. As a result, the inner surface of the inlet valve and of the brewing vessel or evaporating vessel is also for the first time utilized for evaporation.

The swirl element according to the invention is furthermore characterized by a wide range of applications in view of the improved evaporation. It may thus be employed in a multiplicity of brewing vessels as mentioned in the foregoing.

A particular advantage of the use of the swirl element according to the invention is the avoidance of installations such as, e.g., ascending pipes or the like in brewing vessels. As a result, soiling of the inside of the vessel and also of ascending pipes or the like installed in the latter is avoided or reduced further.

Further advantages consist in an enhanced quality of the resulting mashs, worts, beers, or the like. Apart from this, the known brewing processes may be designed to be more cost-efficient. Energy and work time are moreover saved. Ultimately, the quality and stability of the taste of a beverage produced in this way, in particular of a beer or beer-mix beverage, may be enhanced.

Advantageous developments of the swirl element according to the invention are subject matter of the appended claims 2 and 3.

Thus, the swirl element according to the invention may comprise a support structure. The support structure supports the flow-directing element while determining its three-dimensional orientation.

In particular it is an advantage if the support structure has a substantially cylindrical or pipe-shaped configuration. A support structure having a substantially round cross-section causes minimum flow resistance to a flow around the support structure.

Moreover, in the swirl element according to the invention at least one flow-directing element may be arranged on an outer peripheral surface and/or on an inner surface of the support structure. This arrangement allows maximum freedom of design for the swirl element while leaving a margin for a configuration optimized with regard to flow.

It is particularly advantageous if the flow-directing element has a helical or spiral-shaped configuration. Hereby it is possible, in a simple constructive manner, to achieve an acceleration in a tangential direction for imparting an angular momentum or for the generation of a spin, whereby products are subjected to a mild treatment.

Moreover there is a possibility of the pitch of the flow-directing element not being constant across a portion that is in contact with the flow. This advantageously allows a pre-setting of variable forces which act while the liquid flows through the swirl element. Hereby a non-constant acceleration of the liquid may be obtained in a particularly simple manner.

In particular, the pitch of the flow-directing element may decrease in a downstream direction across the portion that is in contact with the flow. Hereby an increasing acceleration of the liquid during its passage through the swirl element is achieved, with the shear forces increasing not abruptly but steadily. This realizes an acceleration that subjects products to a particularly mild treatment and avoids frothing.

Due to the decreasing pitch of the flow-directing element, the area of cross-section of flow is decreased the flow-directing element in a downstream direction, whereby an increase of pressure on the liquid passing through is obtained in an advantageous manner.

This moreover results in the appearance of a stagnation point ensuring by its increased pressure loss that the valve situated upstream will not run dry.

At a downstream-side end portion, the support structure may have a diameter that is increased in comparison with the diameter at an upstream-side end portion. Due to an additional radial acceleration component, this increased diameter makes it easier for the flow to detach at the downstream-side end portion of the swirl element.

At a downstream-side end portion, the support structure may have a diameter which is reduced in comparison with the diameter at an upstream-side end portion. This allows the formation of a flow disruption edge advantageously making it easier for the flow to detach at the downstream-side end portion of the swirl element.

What is moreover proposed for the first time is an inlet valve for introducing a liquid, in particular a mash, a wort, a yeast suspension, a sparge water or the like into the brewing vessel, in particular into a mash tun, a mash vat, a combined mash/wort tun, a combined mash/wort/stripping tun, a wort tun, a combined whirlpool tun, a whirlpool, a clarifying device, an evaporating vessel, a yeast tank or the like, with the inlet valve comprising a valve housing and the swirl element in accordance with the invention.

Thus, at least one opening through which the liquid may be introduced into the brewing vessel of the evaporating device may be formed between the support structure and an inner surface of the valve housing. In a view opposite to the direction of flow, the at least one opening substantially has the shape of a circular ring segment, with the circular ring segment being delimited by the outer peripheral surface of the support structure, the inner surface of the valve housing, and the downstream-side end portion of a flow-directing element or the downstream-side end portions of two flow-directing elements.

Here it is possible to account for a volumetric flow rate range for the formation of an optimum liquid film by means of a suitable pre-setting of the size of the opening. In addition, the flow velocity of the liquid exiting from the inlet valve at a predetermined volumetric flow rate may be pre-set by means of the size of the opening.

The advantages of the swirl element according to the invention that were discussed in the foregoing analogously apply to the inlet valve according to the invention.

The swirl element may have a diameter that is between 0.8 times to 1.1 times, in particular between 0.9 times to 1.0 times of the internal diameter of the valve housing.

Advantageous developments of the inlet valve of the invention are subject matter of appended claims 5 and 6.

Thus, during the evaporation or degassing process the gap width between the swirl element and the valve housing may be between 0 to 40 mm. A gap width between 10 to 20 mm is particularly advantageous. In particular, a gap width setting of about 15 mm is preferable.

Thus, the inlet valve may comprise an inner surface, in particular one formed on a flange for coupling to the brewing vessel of the evaporation device, on which a liquid film may be formed. This intentional designation of the inner surface as the impact surface for the liquid film allows an uninterrupted transition of the flow from the inlet valve to the inner surface of the brewing vessel. This in turn brings about an introduction of the liquid with little turbulence and frothing. In addition, an optimum flow transition from the swirl element to the surrounding inner surface may already be pre-set at the manufacturer's and independently of the configuration of the brewing vessel even before the inlet valve has been mounted in the evaporating device.

In an advantageous development, the inlet valve further comprises an internal element, with the internal element being arranged coaxially with the swirl element and connected to the swirl element. The internal element delimits the flow path of the liquid on its outer peripheral surface from another flow path, for example of a vacuum conduit. This enables parallel guidance of two fluid flows within the inlet valve, resulting in a compact construction. The presence of the internal element moreover enables a "calming of flow" of the inflowing liquid to be degassed before its arrival at the swirl element.

It may be possible to deflect the liquid flowing through the inlet valve at an outer peripheral surface of the swirl element. In contrast with deflection at an inner surface, it is hereby possible to maximize the imparted angular momentum and enable parallel guidance of another fluid within the swirl element.

In addition, the liquid film produced by the swirl element may impinge on a predetermined area of the inner surface of the inlet valve. As a result, the surface of the inner wall of the brewing vessel that is utilized for evaporating or degassing is enlarged in an advantageous manner. Here it is particularly advantageous if the liquid preferably is applied to the inner surface of the inlet valve at only a small distance from the opening.

In another embodiment, the inlet valve may be configured such that the liquid film impinges on a predetermined area of the inner surface of the brewing vessel. In this embodiment it is possible to do away with a flange, whereby the construction of the inlet valve is simplified. Furthermore the transition of liquid from the inlet valve to the brewing vessel may be configured such that frothing is largely prevented or at least reduced.

It may moreover be advantageous if, in yet another embodiment, the size of the opening is adapted to be controlled in accordance with the volumetric flow rate of the liquid flowing through the inlet valve. This may be effected, e.g., by displacing the swirl element according to the invention along the center axis of the inlet valve in the direction of flow, to thereby enlarge the opening. Accordingly it is possible to respond in a flexible manner even to extraordinarily high variations in the treatment or processing of the liquid, such as variations of volumetric flow rate caused by other work units. Such control may be performed by an additional control means.

In this context it may also be advantageous that the size of the opening is adapted to be controlled in accordance with the composition of the liquid flowing through the inlet valve. As a result, it is possible to even better account for extraordinarily high inhomogeneities of a batch of liquid, or shifting over to a liquid having an entirely different composition, in the formation of the liquid film.

What is furthermore proposed is an evaporating device comprising a brewing vessel also for evaporating and/or degassing or partial or complete expulsing or stripping of highly volatile substances or gases, in particular highly volatile flavor substances, DMS, carbon dioxide, oxygen or the like from liquids in particular from a mash, a wort, a yeast suspension, a sparge water, a last wort, a blending water or the like. The brewing vessel, in particular the mash tun, the mash vat, the combined mash/wort tun, the combined mash/wort/stripping tun, the wort tun, the combined whirlpool tun, the whirlpool, the clarifying device, the evaporating vessel, the yeast tank or the like comprises an above discussed swirl element according to the invention and/or a corresponding inlet valve supplying the liquid.

The advantages of the swirl element discussed in the foregoing apply analogously to the evaporating device according to the invention which comprises the swirl element according to the invention and/or the inlet valve according to the invention.

In terms of process technology, the object is achieved through the method according to the invention for evaporating and/or expulsing highly volatile substances or gases, in particular highly volatile flavor substances, DMS, carbon dioxide, oxygen or the like from liquids in a brewing process. Here a liquid, in particular a mash, a wort, a yeast suspension, a sparge water, a last wort, a blending water or the like is introduced into a brewing vessel by means of the inlet valve according to the invention. The inlet valve moreover comprises a valve housing and the swirl element according to the invention comprising at least one flow-directing element, wherein an angular momentum is imparted to the introduced liquid by the at least one flow-directing element. The admission pressure of the inflowing liquid is within a range from 0.5 to 2.5 bars, in particular about 1.5 bars.

Due to the fact that in accordance with the invention an angular momentum is for the first time imparted to the liquid film formed, a detachment of the film in a substantially horizontal direction is achieved. Accordingly, the film impinges on a contiguous surface, e.g., a surface having a substantially horizontal orientation, after a shortest possible time and distance. Because of the tangential acceleration of the liquid engendered by the angular momentum, the liquid is advantageously prevented from detaching and dripping down, which would otherwise result in a degradation of the evaporating or degassing effect and in intensified frothing.

The features and advantages mentioned for the devices according to the invention apply analogously to the method according to the invention according to claim 8 and its advantageous development according to claim 9.

Thus, the liquid may form a liquid film while passing through at least one opening, with the opening being formed between the support structure and an inner surface of the valve housing. A liquid film has a high surface-to-volume ratio in comparison, e.g., with a pipe flow, so that the gases contained in the liquid may be expulsed easily.

Furthermore, in the method according to the invention the liquid film may be formed in an umbrella shape. An umbrella-type formation of the liquid film leads to a particularly high surface-to-volume ratio, whereby an even better expulsion of the highly volatile substances and/or gases contained in the liquid is enabled.

Furthermore, in accordance with the method of the invention the liquid film may impinge on a predetermined area of the inner surface of the inlet valve. The liquid film may, however, also impinge on a predetermined area of the inner surface of the brewing vessel.

In particular, as the liquid flowing out of the inlet valve passes through at least one opening of the valve housing, a liquid film may be produced in such a way that the liquid film directly attaches to an inner surface of the brewing vessel of the evaporating device.

The object is furthermore achieved through the use of the swirl element in a brewing process according to claim 10.

Thus, what is proposed is the use of the swirl element according to the invention in a brewing process for evaporating and/or expulsing highly volatile substances or gases, in particular highly volatile flavor substances, DMS, carbon dioxide, oxygen or the like from liquids, in particular from a mash, a wort, a yeast suspension, a sparge water, a last wort, a blending water or the like during their introduction into a brewing vessel.

Advantageous developments of the swirl element according to the invention are subject matter of appended claims 11 to 15.

Thus, the swirl element according to the invention may be used for evaporating highly volatile flavor substances, in particular DMS, from a mash while the latter is introduced into the mash tun, the mash vat, into a clarifying device such as, e.g., a clarifying vat or a mash filter, into the combined mash/wort tun, a combined mash/wort/stripping tun, or into an evaporating vessel.

Furthermore, the swirl element according to the invention may be used for evaporating highly volatile flavor substances, in particular DMS, from a wort during its introduction into the combined mash/wort tun, a combined mash/wort/stripping tun, into the wort tun, into the combined whirlpool tun, into the whirlpool, or into an evaporating vessel.

Moreover, the swirl element according to the invention may be used for evaporating highly volatile flavor substances, in particular DMS, from a wort prior to cooling of the wort, in particular inside a wort cooler.

The swirl element according to the invention may furthermore be used for degassing or for partial or complete expulsing or stripping of gaseous substances, in particular of carbon dioxide, from a yeast suspension, in particular of harvested yeast and processing yeast.

Through the use of the swirl element it is made possible for the first time to largely or at least partly free a yeast suspension, in particular harvested or processing yeast, of carbon dioxide or other gaseous substances in a gentle and efficient manner.

Finally, the swirl element according to the invention may be used for degassing or for partial or complete expulsing or stripping of gaseous substances, in particular of oxygen from a sparge water, a last wort, a blending water or mixtures of these during the introduction thereof into a clarifying device.

In accordance with the invention, a blending water is understood to be a water that is used for diluting wort or beer, e.g. in high-gravity brewing. In accordance with the invention the liquid may also be understood to be a water used in filtration of the wort or of the beer.

Apart from this, the features of the devices according to the invention and/or the method according to the invention and/or the use according to the invention may all be combined among each other.

In the following, the invention shall be explained in more detail through practical examples while making reference to the figures of the drawings, wherein:

BRIEF DESCRIPTION OF THE DRAWINGS

FIG. 12 is a schematic cross-sectional view of another embodiment of the inlet valve of the invention; and FIG. 13 is a schematic lateral view of the embodiment of the inlet valve according to the invention of FIG. 12;

DETAILED DESCRIPTION

Figure 1:
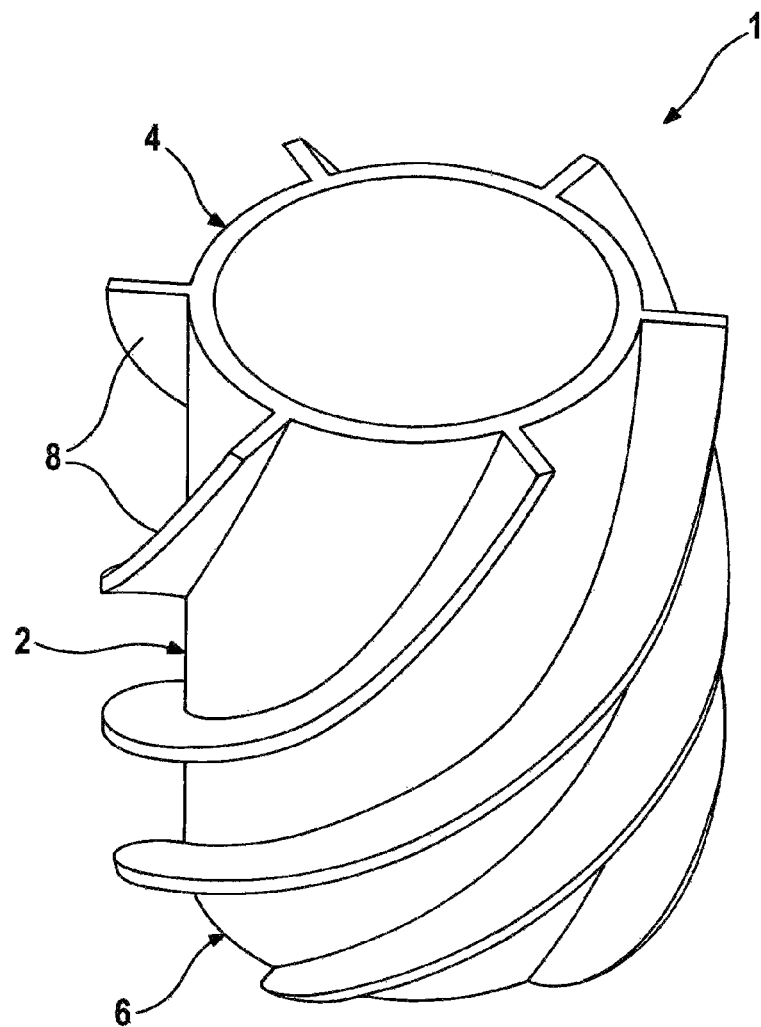
FIG. 1 is a schematic perspective view of a first exemplary embodiment of the swirl element according to the invention.

In accordance with the representation in FIG. 1, a swirl element 1 comprises a support structure 2 having an upstream-side end portion 4 and a downstream-side end portion 6. The support structure 2 has the shape of a substantially cylindrical hollow body.

The swirl element 1 further comprises six flow-directing elements 8 which are arranged on the outer peripheral surface of the support structure 2. The flow-directing elements 8 have a strip-type shape in a helical configuration, with the length of a flow-directing element 8 being a multiple of its width and also of its thickness. The flow-directing elements 8 are continuously connected to the cylindrical support structure 2 at their longitudinal sides. They project substantially perpendicularly from the outer peripheral surface of the support structure 2. Guiding by the flow-directing elements 8 takes place clockwise when viewed in the direction of flow of the liquid. The flow-directing elements 8 begin at the upstream-side end portion 4 of the support structure 2 and reach as far as the downstream-side end portion 6 thereof. When viewed in the central perspective, the flow-directing elements 8 include a range of about half the circumference (approx. 180 degrees) of the support structure 2 between the upstream-side end portion 4 and the downstream-side end portion 6. The pitch of the flow-directing elements 8 is greater in the vicinity of the upstream-side end portion 4 than in the vicinity of the downstream-side end portion 6. I.e., when viewed in the direction of flow, the flow-directing elements 8 are inclined more steeply at the upstream-side end portion 4 while being formed with less inclination at the downstream-side end portion 6.

Due to this guiding configuration, a liquid flowing in at the end portion 4 initially is accelerated only slightly. As the liquid continues to flow along the flow-directing element 8 of the swirl element 1, the tangential acceleration increases toward the end portion 6 owing to the decreasing pitch of the flow-directing elements 8, such that a clockwise rotating movement about the center axis is increasingly superimposed on the longitudinal flow movement of the liquid along a center axis of the swirl element 1. The rotating movement may, however, also be directed counter-clockwise about the center axis.

Figure 2:
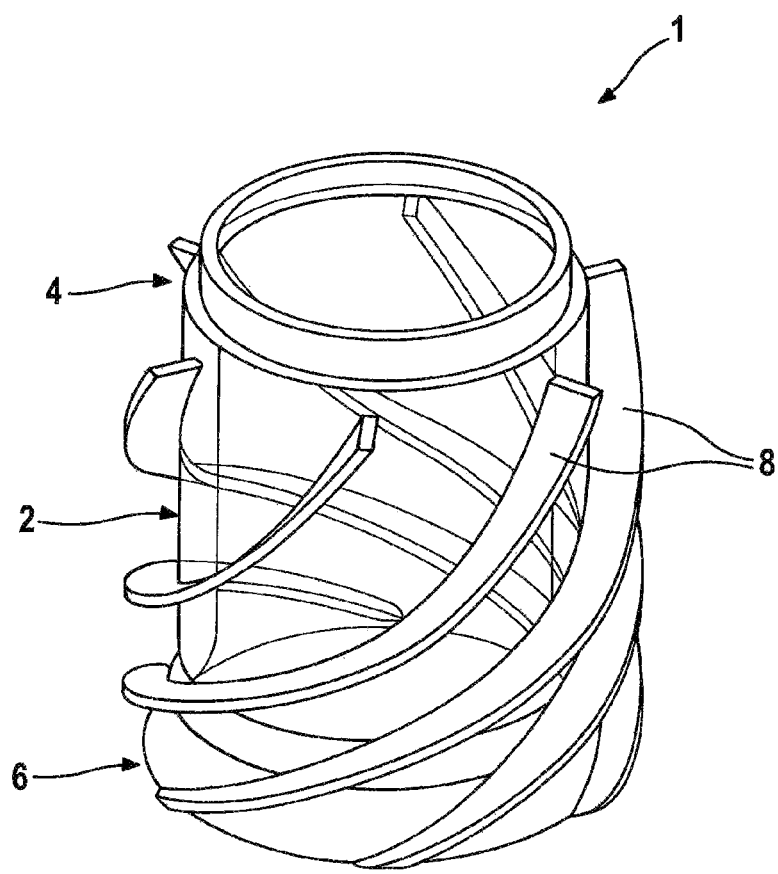
FIG. 2 is a schematic perspective view of a second exemplary embodiment of the swirl element according to the invention.

Another exemplary embodiment of the swirl element 1 is represented in FIG. 2. As regards the features that are identical in the first embodiment according to FIG. 1 and the second embodiment according to FIG. 2, reference is made to the description of FIG. 1.

At the downstream-side end portion 6 of the support structure 2, the second embodiment of the swirl element 1 according to FIG. 2 has a diameter that is enlarged in comparison with the diameter of the upstream-side end portion 4 of the support structure 2.

The enlarged diameter of the downstream-side end portion 6 of the support structure 2 brings about an additional deflection of the liquid flow in a substantially radial direction relative to the center axis of the swirl element 1. The liquid passing through thus receives an additional velocity component that is directed perpendicularly to the center axis of the swirl element 1. The radial acceleration thus obtained advantageously makes it easier for the liquid film to detach at the end portion 6 of the support structure 2. The upstream-side end portion 4 has a stepped taper.

Figure 3:
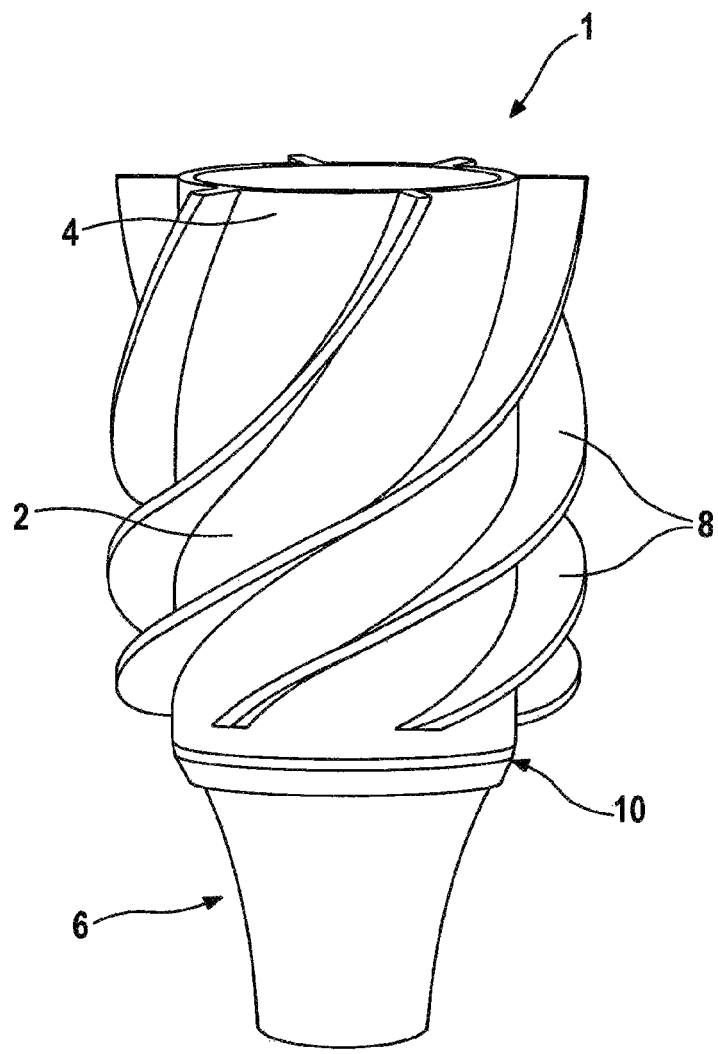
FIG. 3 is a schematic perspective view of a third exemplary embodiment of the swirl element according to the invention.

A third exemplary embodiment of the swirl element 1 is represented in FIG. 3. As regards the features that are identical in the first embodiment according to FIG. 1 and the third embodiment according to FIG. 3, reference is made to the description of FIG. 1.

At the downstream-side end portion 6 of the support structure 2, the third embodiment of the swirl element 1 according to FIG. 3 has a diameter that is reduced in comparison with the diameter of the upstream-side end portion 4 of the support structure 2. The decrease in diameter of the support structure 2 at the end portion 4 in the direction of flow is not linear but curve-shaped, with the decrease in diameter being uniform. This results in the formation of an edge 10 at the transition from the cylindrical portion of the support structure 2 to the end portion 4 which increasingly tapers in the direction of flow. At a sufficient tangential acceleration of the flowing liquid, this edge 10 makes it easier for it to detach from the outer peripheral surface of the support structure 2.

Figure 4:
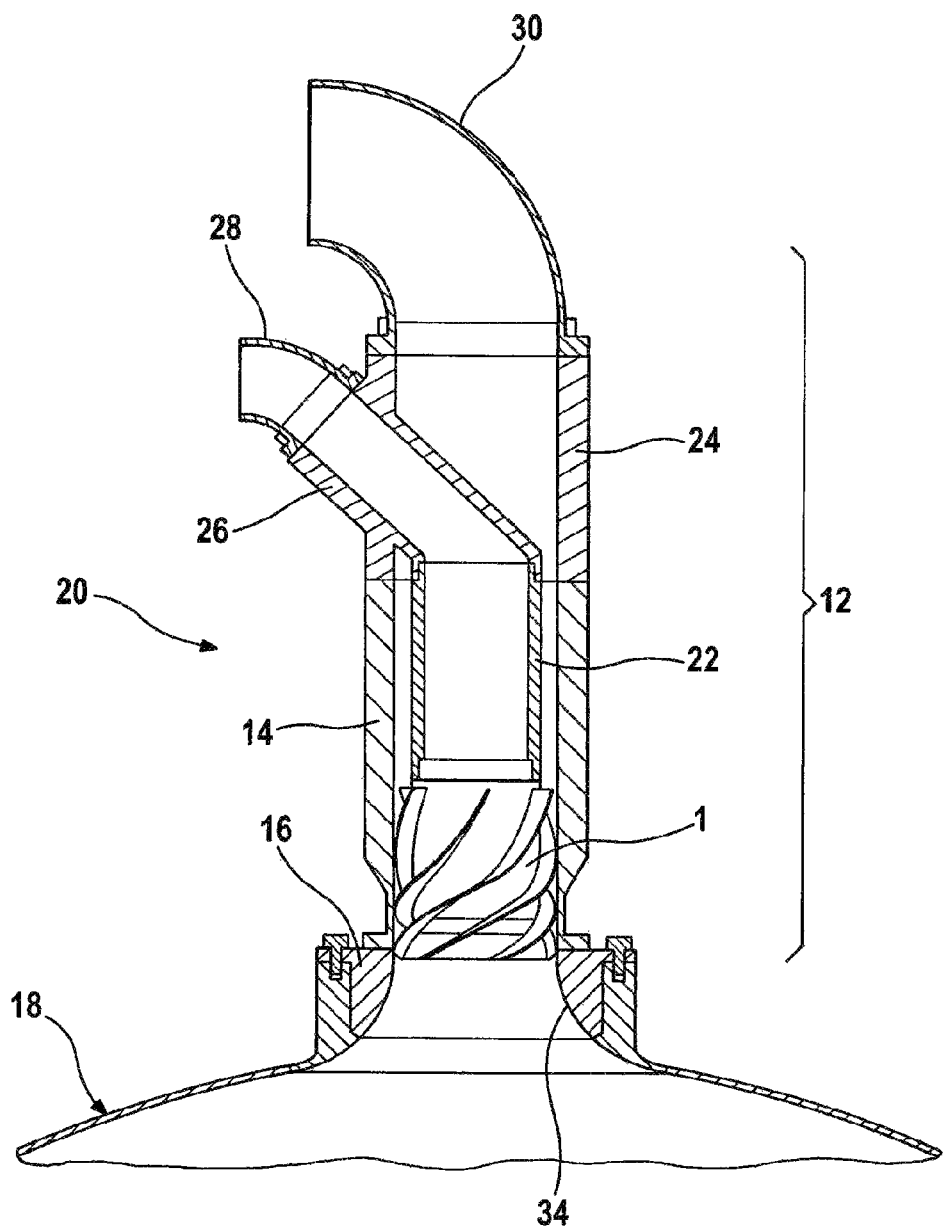
FIG. 4 is a schematic, partially sectional view of an exemplary embodiment of the inlet valve of the invention comprising the swirl element of FIG. 2.
Figure 5:
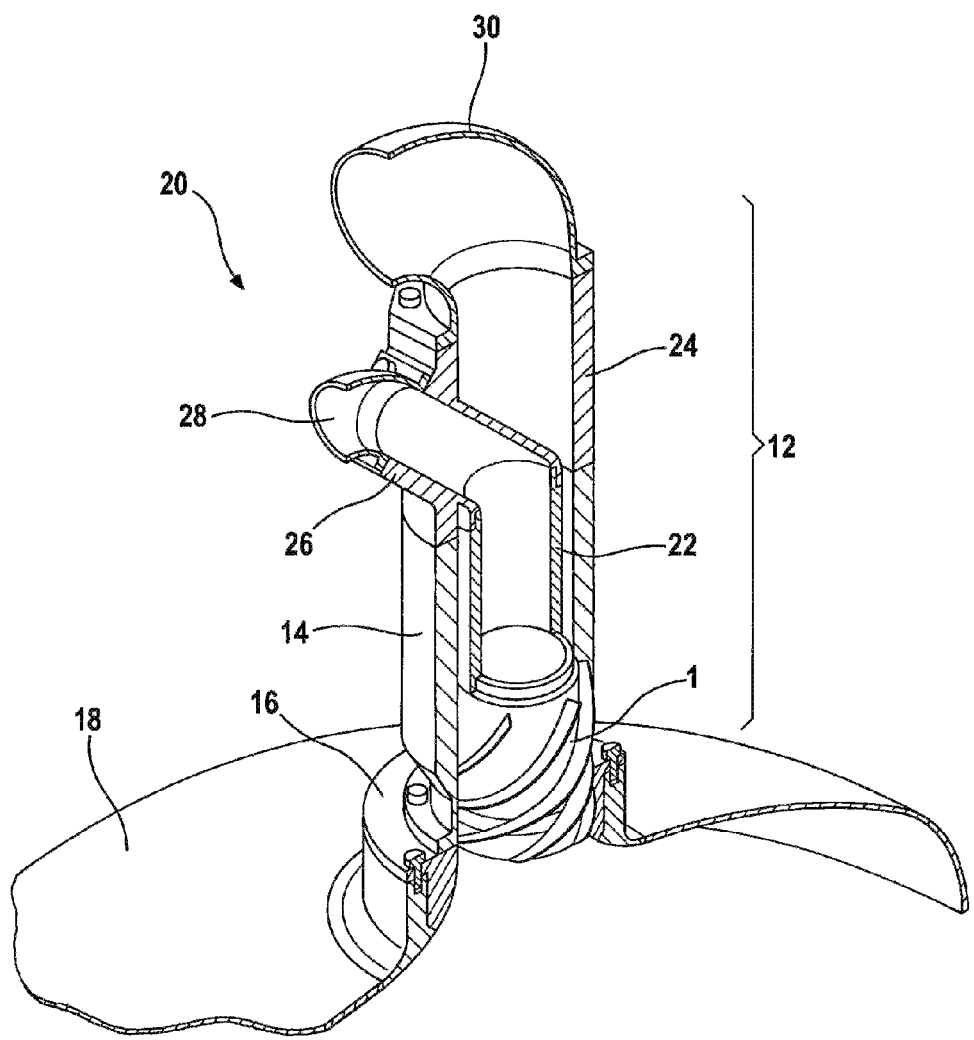
FIG. 5 is a schematic, perspective, partially sectional view of the inlet valve according to the invention of FIG. 4.

In accordance with the representations in FIG. 4 and FIG. 5, an inlet valve 12 comprises the swirl element 1, a valve housing 14, a flange 16 for coupling to the brewing vessel 18 of an evaporating device 20, an internal element 22, a liquid feed means 24, and a vacuum connection 26. With regard to the swirl element 1 of this embodiment, reference is made to the description of FIG. 2.

The valve housing 14 substantially has the form of a cylindrical hollow body. In its upstream-side end portion it comprises the liquid feed means 24 and the vacuum connection 26. At its downstream-side end portion, the valve housing 14 is connected to the flange 16. The flange 16 is integrated into the brewing vessel 18 of the evaporating device 20. Components of the evaporating device 20 that are represented in FIG. 4 and FIG. 5 are the inlet valve 12 and the brewing vessel 18. For further components of the evaporating device 20 such as, e.g., pumps or control means, it is possible to employ commercially available components that are known from the prior art.

The swirl element 1 is arranged inside the valve housing 14. To be more precise, the swirl element 1 is arranged at the downstream-side end portion of the valve housing 14 and coaxially with the center axis of the latter. The diameter of the support structure 2 is smaller than the internal diameter of the valve housing 14, whereby a substantially cylindrical cavity accommodating the flow-directing elements 8 is formed between the support structure 2 and the valve housing 14. The internal element 22, which has substantially the same shape as the support structure 2 and a substantially identical diameter, is placed on the upstream-side end portion 4 of the swirl element 1. This equally results in the formation of a substantially cylindrical cavity between the internal element 22 and the valve housing 14. The transition from the internal element 22 to the swirl element 1 is uniform both on the inner side and on the outer peripheral surface.

At its upstream-side end portion the internal element 22 is connected to the vacuum connection 26 so as to be flush with it. The vacuum connection 26 is a pipe-shaped connecting sleeve which connects a vacuum line 28 to the inside of the internal element 22 and is taken through the wall of the liquid feed means 24. The inner space of the brewing vessel 18 is connected directly to the vacuum line 28 via the cavities on the inside of the swirl element 1, the internal element 22, and the vacuum connection 26. A liquid line 30 supplying the liquid to be evaporated or degassed is connected to the liquid feed means 24.

Figure 6:
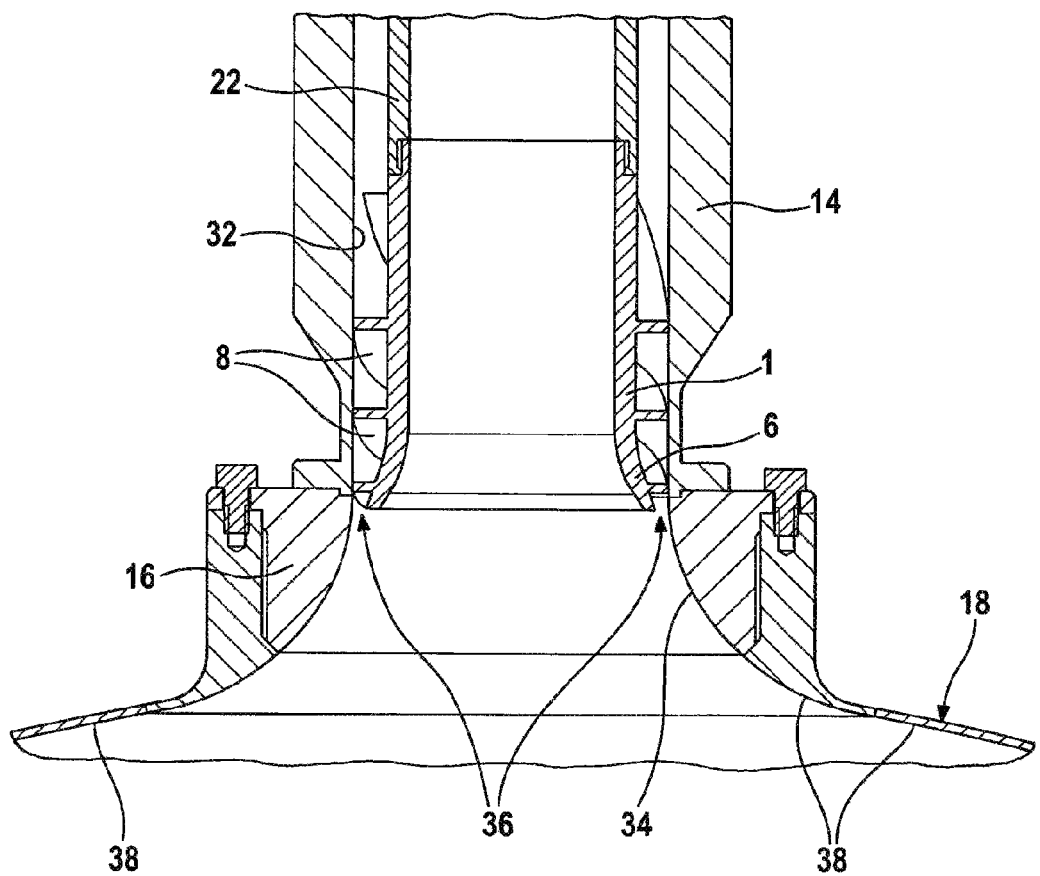
FIG. 6 is a detailed sectional view of the exemplary embodiment of the inlet valve according to the invention of FIG. 4.

As may particularly be seen from the detailed representation of FIG. 6, the diameter of the swirl element 1 with the flow-directing elements 8 arranged on its outer peripheral surface substantially corresponds to the internal diameter of the valve housing 14. The outer edges of the flow-directing elements 8 flushly contact an inner surface 32 of the valve housing 14. Between the downstream-side end portion 6 of the swirl element 1 and the transition from the inner surface 32 of the valve housing 14 to an inner surface 34 of the flange 16, an opening 36 having the form of an annular gap is formed, with the inner surface 32 of the valve housing 14 continuing uniformly to the inner surface 34 of the flange 16. The inner surface 34 of the flange 16 in turn uniformly continues to a flushly connecting inner surface 38 of the brewing vessel 18. The inner surface 34 of the flange 16 substantially has the shape of a truncated cone with a flank in the shape of a curve. In a global view, the orientation of a tangent to the inner surface 32 of the valve housing 14 changes via one at the flange 16 to one at the brewing vessel 18, from a substantially vertical orientation to a substantially horizontal orientation with a continuously uniform transition.

The evaporating device 20 comprises an inlet valve 12 according to the invention, however at least one swirl element 1 according to the invention as well as a brewing vessel 18. All further units such as, e.g., pumps or control means, are those of an evaporating device as known per se and are therefore not described in detail.

During the evaporating or degassing process, the gap width between the swirl element 1 and the valve housing 14 is between 0 to 40 mm. A gap width between 10 to 20 mm is particularly advantageous. In particular, a gap width adjustment of about 15 mm is preferable.

In order to evaporate substances from a liquid in the evaporating device 20, the liquid is introduced into the brewing vessel 18 via the inlet valve 12. The liquid flows to the inside of the liquid feed means 24 via the liquid line 30. The liquid flows vertically downwards through the cavity formed between the internal element 22 and the valve housing 14 and further on to the cavity formed between the support structure 2 and the valve housing 14, to then contact the outer peripheral surface of the support structure 2 and the peripheral surfaces of the flow-directing elements 8. While flowing through this cavity, the liquid is deflected and accelerated, respectively, in the above-described manner while also being imparted an angular momentum in accordance with the guidance by the flow-directing elements 8. The tangentially accelerated liquid exits through the opening 36 in the shape of an umbrella-type liquid film and attaches itself to the inner surface 34 of the flange 16. On this inner surface and on the subsequent inner surface 38 of the brewing vessel 18 the liquid flows off as a continuous liquid film. The liquid film flows from the ceiling of the brewing vessel 18 via the lateral inner walls having an oblique or substantially vertical orientation to the bottom thereof or into a collecting channel or the like where the accumulated, degassed liquid is withdrawn. As a result, during the evaporating or degassing process basically the entire inner surface of the brewing vessel 18 is covered by the film of liquid to be degassed which is in continuous contact with the wall while flowing off.

The properties of the liquid film formed by the inlet valve 12 are crucial for the quality of evaporating or degassing. Thus in particular the thickness of the liquid film determines whether or not all of the volume elements of the liquid are subjected to the evaporating or degassing conditions prevailing at the surface of the liquid. This in turn has an influence on completeness of evaporation and/or degassing of the liquid. Advantageously the thickness of the liquid film is up to about 5 mm, preferably up to 3 mm, in particular up to 1.5 mm.

The volumetric flow rates through the inlet valve according to the invention typically are 5 to 90 $m^3/h$, preferably 5 to 60 $m^3/h$, and in particular 5 to 45 $m^3/h$. The admission pressure of the inflowing liquid is within a range from 0 to 3 bars, preferably 0.5 to 2.5 bars, in particular about 1.5 bars. The absolute pressure on the inside of the degassing vessel may be less than 800 mbars, preferably less than 200 mbars, in particular less than 100 mbars. The internal diameter of the valve housing 14 of the inlet valve 12 is up to 400 mm, preferably up to 250 mm, in particular up to 150 mm. The length of the valve housing 14 is between one and ten times, preferably two to five times, its internal diameter. The swirl element 1 has a diameter of between 0.8 times to 1.1 times, in particular between 0.9 times to 1.0 times the internal diameter of the valve housing 14. The inlet valve 12 may be used for evaporating or degassing liquids which preferably have a viscosity similar to that of water.

Besides the explained practical examples, the invention allows for additional configuration approaches.

Instead of a stepped taper, the upstream-side end portion 4 of the support structure 2 may also have any other desired shape.

The downstream-side end portion 6 of the support structure 2 may additionally have an undercut for the formation of a flow disruption edge.

The flow-directing elements 8 of the swirl element 1 need not be arranged on the outer peripheral surface of the support structure 2. Conceivably they may also be arranged in the cavity of the support structure 2, in particular on a cylinder inner surface of the support structure 2.

The number of flow-directing elements 8 is not restricted to 6. The swirl element 1 may have at least 1, preferably 2 to 18, in particular 4 to 8 flow-directing elements 8.

The flow-directing elements 8 may moreover have a configuration that is different from the strip shape. Thus, for instance, they may be realized as narrow strip portions. These may moreover have a staggered arrangement relative to each other. Furthermore they need not be connected to the cylinder surface of the support structure 2 over their entire longitudinal sides; fastening to the support structure 2 in sections or points is equally conceivable.

In addition, the angle formed by the flow-directing elements 8 and the outer peripheral surface of the support structure 2 may also randomly differ from a right angle.

Guidance by the flow-directing elements 8 may also be oriented counter-clockwise when viewed in the direction of the liquid's flow.

The flow-directing elements 8 need not extend all the way from the upstream-side end portion 4 of the support structure 2 to the downstream-side end portion 6 thereof. Possibly at least one part of the flow-directing elements 8 only extends across a part of the length of the shaft 2.

Moreover, the flow-directing elements 8 may also encompass more or less than a range of about half the circumference of the support structure 2 (approx. 180 degrees). Alternatively, this range may reach from about 15 degrees up to several turns about the shaft.

The pitch of at least one of the flow-directing elements 8 may also be smaller in the vicinity of the upstream-side end portion 4 than in the vicinity of the downstream-side end portion 6. The pitch may, however, also be constant across the entire length of the support structure 2.

Both the support structure 2 of the swirl element 1 and the internal element 22 need not necessarily have the form of a hollow cylinder. At least one of them may be realized as a solid cylinder or in a similar form. Moreover, at least one of them may also have a grid-type form and/or have recesses. Moreover, the support structure 2 and/or the internal element 22 may also have a cross-section having a polygonal or substantially elliptical shape.

The swirl element 1 may furthermore be connected integrally to the internal element 22. Alternatively, the two may be realized as a single component. Moreover it is conceivable for the inlet valve according to the invention to not include an internal element 22.

Coupling of the brewing vessel 18 to vacuum need not necessarily be effected via the inlet valve 12. It may also be effected in any other desired manner outside of the inlet valve 12. In this case, the vacuum connection 26 inside the inlet valve 12 may be omitted.

The inlet valve 12 does not have to be fastened to the brewing vessel 18 by means of the flange 16. It is also conceivable to fasten the inlet valve 12 directly to the brewing vessel 18, without the flange 16.

The outer edges of the flow-directing elements 8 do not have to flushly contact the inner surface 32 of the valve housing 14 but may also be spaced apart from it so that at least one gap is formed between the flow-directing elements 8 and the inner surface 32 of the valve housing 14.

The opening 36 does not necessarily have the shape of a circular ring segment. It may also have any other suitable shape.

The shape of the inner surface 34 of the flange 16 may alternatively also have a shape that is different from a truncated cone with a curve-shaped flank. For example, the configuration of a truncated cone with a linear flank shape is possible.

The feeding of liquid via the liquid feed means 24 is not restricted to a vertical feeding direction. It may also have any other desired direction.

After the liquid exits from the opening 36, the formed liquid umbrella may also impinge on a predetermined area of the inner surface 38 of the brewing vessel 18.

The above-described swirl element, or the inlet valve equipped with it, may also be used in cooperation with a brewing vessel as a vessel for substantially improved expansion evaporation/chilling in a brewing process. The inlet valve equipped with the swirl element allows an improved expansion evaporation while the liquid is flowing in. Here the effects discussed as being advantageous in the context of evaporating or degassing may be utilized in a similarly advantageous manner for expansion chilling of a hot liquid flowing into the vessel for improved cooling.

Figure 7:
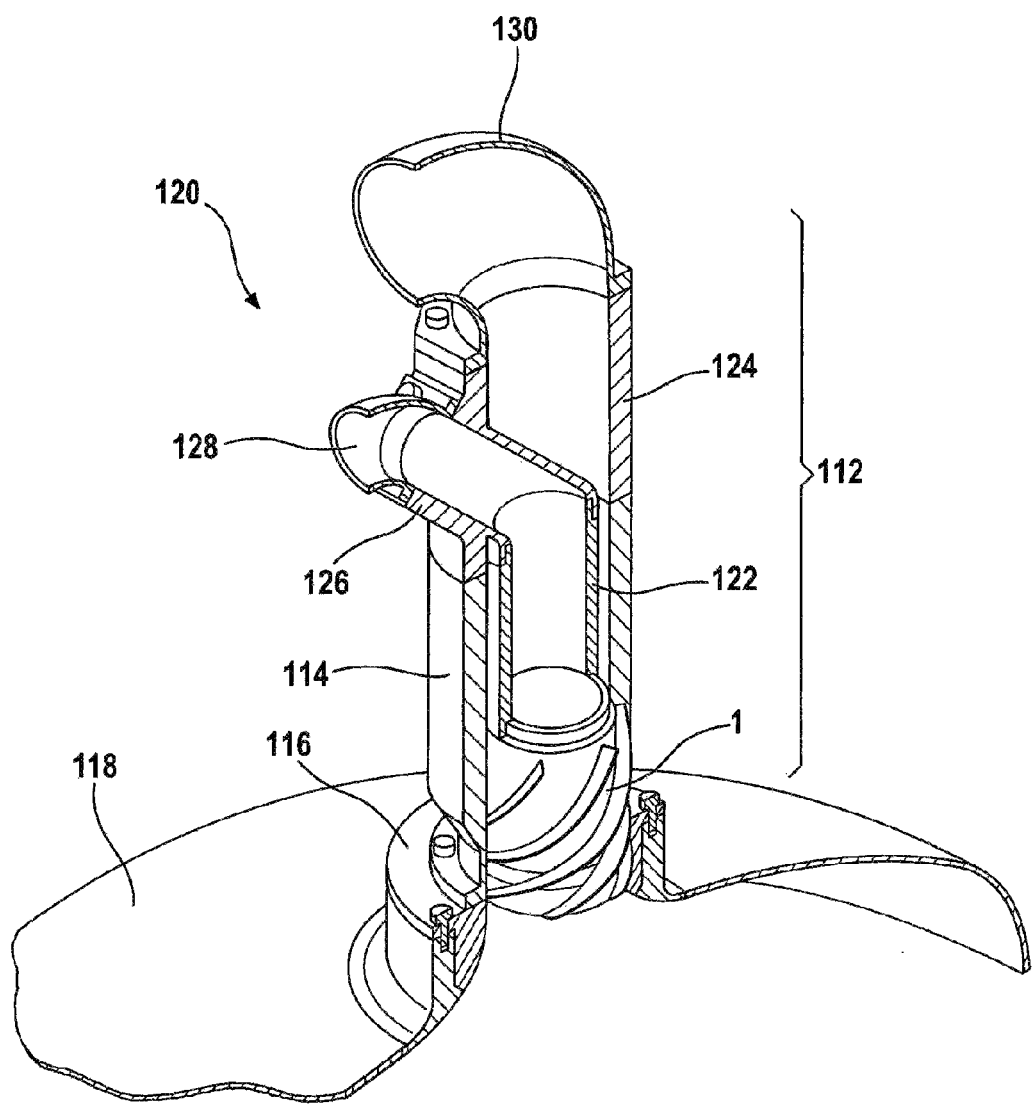
FIG. 7 is a schematic, perspective, partially sectional view of the inlet valve of the invention of another embodiment.
Figure 8:
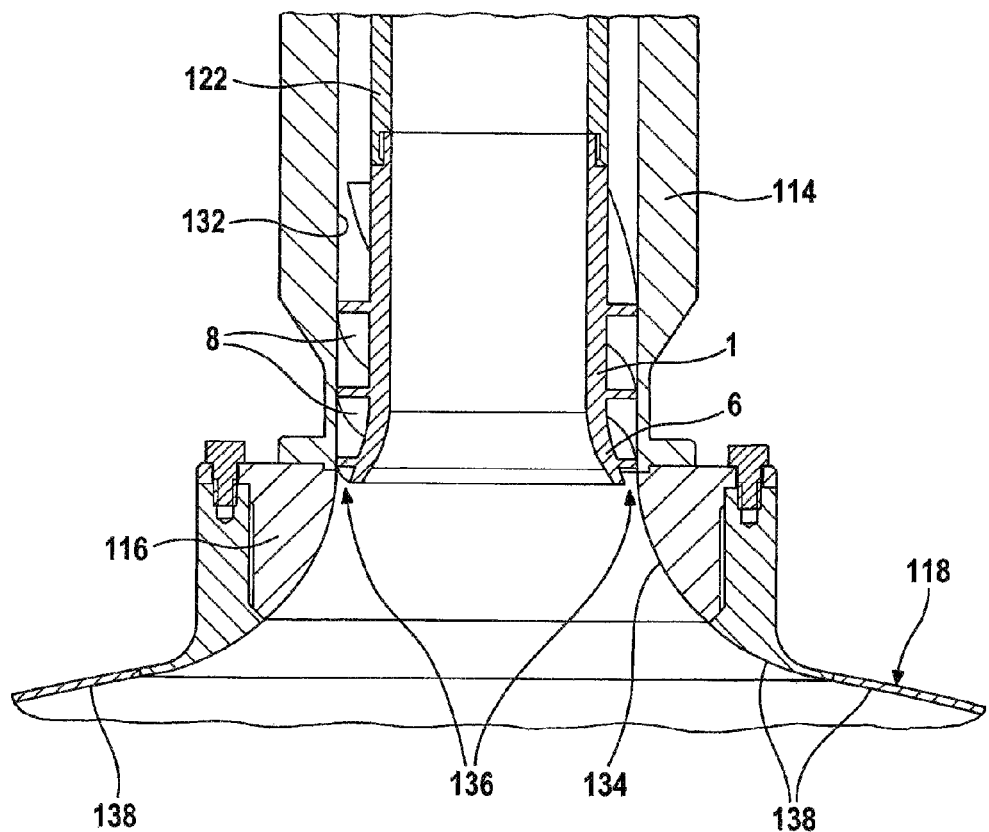
FIG. 8 is a schematic, perspective, partially sectional view of the inlet valve according to the invention of FIG. 7.

In accordance with the representations in FIG. 7 and FIG. 8, an inlet valve 112 comprises the swirl element 1, a valve housing 114, a flange 116 for coupling to the brewing vessel 118 of an evaporating device 120, an internal element 122, a liquid feed means 124, and a vacuum connection 126. As regards the swirl element 1 in this embodiment, reference is made to the description of FIG. 2 by way of example.

The valve housing 114 substantially has the shape of a cylindrical hollow body. In its upstream-side end portion it comprises the liquid feed means 124 and the vacuum connection 126. At its downstream-side end portion, the valve housing 114 is connected to the flange 116. The flange 116 is integrated into the brewing vessel 118 of the evaporating device 120. Components of the evaporating device 120 represented in FIG. 7 are the inlet valve 112 and the brewing vessel 118. For further components of the evaporating device 120 such as, e.g., pumps or control means, it is possible to employ commercially available components that are known from the prior art.

The swirl element 1 is arranged inside the valve housing 14. To be more precise, the swirl element 1 is arranged at the downstream-side end portion of the valve housing 14 and coaxially with the center axis of the latter. The diameter of the support structure 2 is smaller than the internal diameter of the valve housing 114, whereby a substantially cylindrical cavity accommodating the flow-directing elements 8 is formed between the support structure 2 and the valve housing 114. The internal element 122, which has substantially the same shape as the support structure 2 and a substantially identical diameter, is placed on the upstream-side end portion 4 of the swirl element 1. This equally results in the formation of a substantially cylindrical cavity between the internal element 122 and the valve housing 114. The transition from the internal element 122 to the swirl element 1 is uniform both on the inner side and on the outer peripheral surface.

At its upstream-side end portion the internal element 122 is connected to the vacuum connection 126 so as to be flush with it. The vacuum connection 126 is a pipe-shaped connecting sleeve which connects a vacuum line 128 to the inside of the internal element 122 and is taken through the wall of the liquid feed means 124. The inner space of the brewing vessel 118 is connected directly to the vacuum line 128 via the cavities on the inside of the swirl element 1, the internal element 122, and the vacuum connection 126. A liquid line 130 for supplying the liquid to be evaporated is connected to the liquid feed means 124.

As may particularly be seen from the detailed representation of FIG. 8, the diameter of the swirl element 1 having the flow-directing elements 8 arranged on its outer peripheral surface substantially corresponds to the internal diameter of the valve housing 114. The outer edges of the flow-directing elements 8 flushly contact an inner surface 132 of the valve housing 114. Between the downstream-side end portion 6 of the swirl element 1 and the transition from the inner surface 132 of the valve housing 114 to an inner surface 134 of the flange 116, an opening 136 having the form of an annular gap is formed, with the inner surface 132 of the valve housing 114 continuing uniformly to the inner surface 134 of the flange 116. The inner surface 134 of the flange 116 in turn uniformly continues to a flushly connecting inner surface 138 of the brewing vessel 118. The inner surface 134 of the flange 116 substantially has the shape of a truncated cone with a flank in the shape of a curve. In a global view, the orientation of a tangent to the inner surface 132 of the valve housing 114 changes via one at the flange 116 to one at the brewing vessel 118, from a substantially vertical orientation to a substantially horizontal orientation with a continuously uniform transition.

The tangentially accelerated liquid exits through the opening 136 in the shape of an umbrella-type liquid film and attaches itself to the inner surface 134 of the flange 116. On this inner surface and on the subsequent inner surface 138 of the brewing vessel 118 the liquid flows off as a continuous liquid film.

Figure 9:
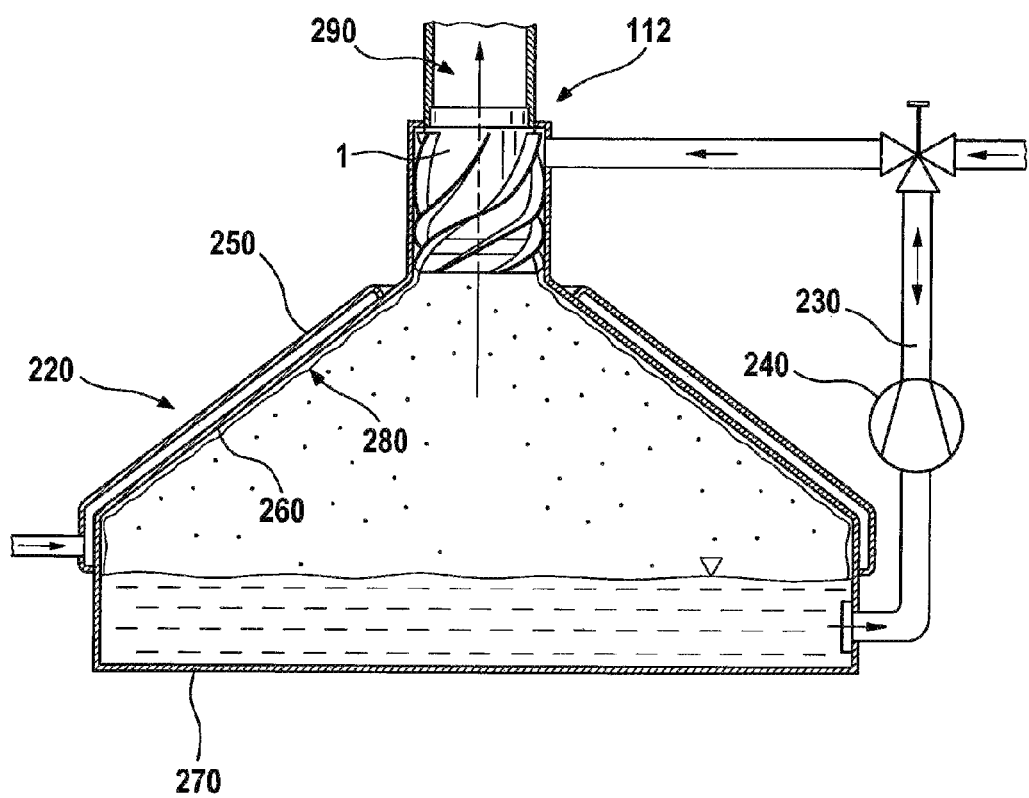
FIG. 9 is a schematic cross-sectional view of a wort tun comprising the inlet valve according to the invention of FIG. 7.

FIG. 9 represents a wort tun 220 is which comprises the inlet valve 112 according to the invention. Here the wort is fed to the inlet valve 112 via a bypass line 230 by means of a pump 240. The inlet valve 112 is arranged in the upper part of the conically tapering tun jacket 250. The tun jacket 250 may be realized as a steam-heatable double jacket.

After the liquid film was formed in the inlet valve 112 by means of the swirl element 1, it flows off along the inner surface 260 of the tun 220 to the bottom 270 thereof. Highly volatile substances evaporate from the liquid film 280 flowing off. The evaporated substances are conducted to the outside through the inner cavity 290 of the inlet valve 1.

Figure 10:
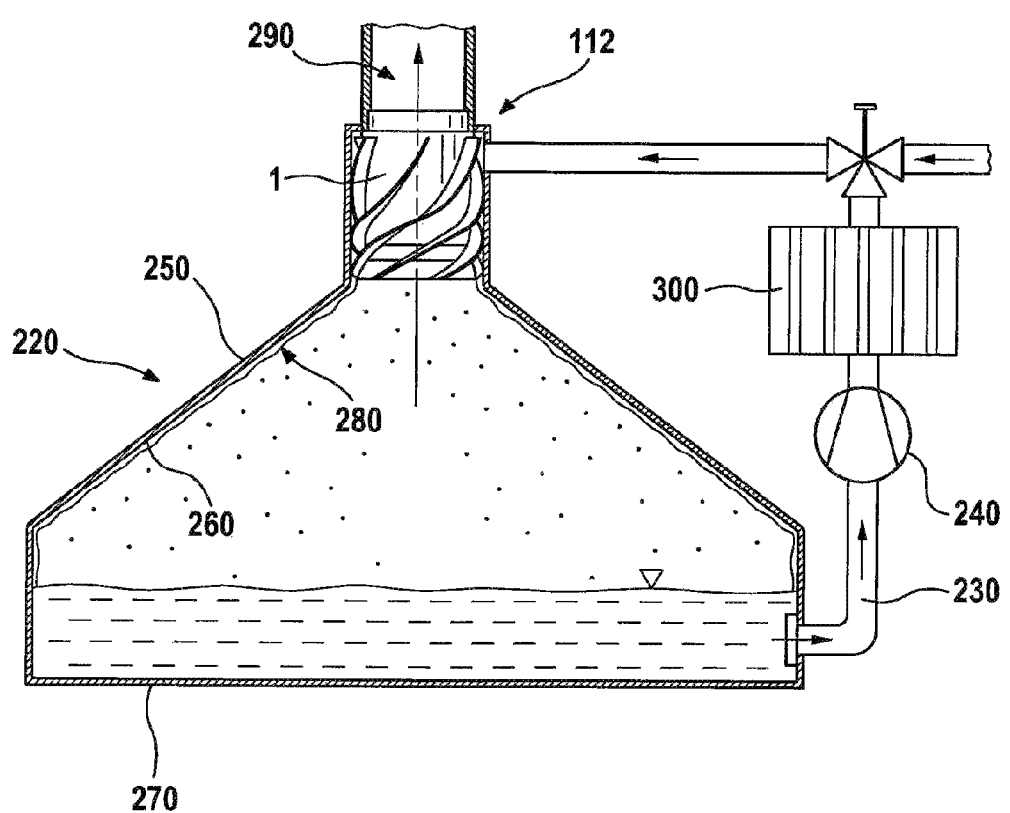
FIG. 10 is a schematic cross-sectional view of a wort tun comprising an external boiler, which comprises the inlet valve according to the invention of FIG. 7.

The embodiment of the wort tun 220 represented in FIG. 10 comprises as a further component an external boiler 300 integrated into the bypass line. For the rest, the construction is analogous with the description of FIG. 9.

Figure 11:
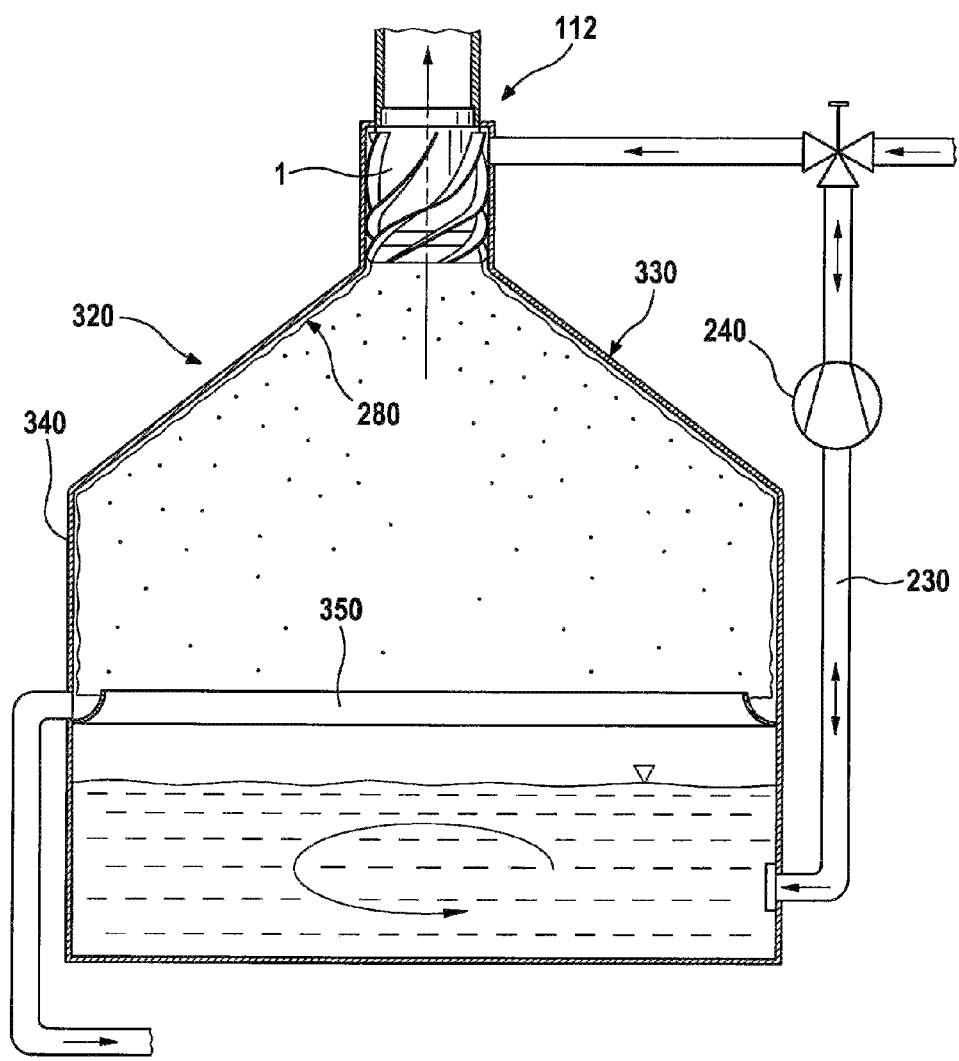
FIG. 11 is a schematic cross-sectional view of a whirlpool comprising the inlet valve according to the invention of FIG. 7.

FIG. 11 represents a whirlpool 320 which comprises the inlet valve 1 according to the invention. Here the wort is fed to the inlet valve 1 via a bypass line 230 with the aid of a pump 240. The inlet valve 1 is arranged in the upper part of the conically tapering whirlpool frame 330. Moreover the whirlpool inner space comprises in the range of its vertical frame 340 a continuous channel 350 for collecting the evaporated wort having a low DMS content.

As regards the evaporation process, reference is made in particular to the description of FIGS. 1 and 6. Thus, following its withdrawal from the channel 350, the wort may be supplied again to the inlet valve 1 any number of times in accordance with the desired degree of evaporation. This may be realized by the bypass line 230 for example. After the desired degree of evaporation has been reached, the wort is finally withdrawn from the collecting channel 350 and supplied to wort cooling.

FIG. 12 and FIG. 13 represent another embodiment of the inlet valve of the invention 112. Here the swirl element 1 is represented in a further optimized implementation, in particular for improving the evaporating efficiency. As regards the detail representation, reference is made to the description of FIG. 7 and FIG. 8.

The invention claimed is:

1. A swirl element for an inlet valve of a brewing vessel for introducing a liquid into the brewing vessel comprising at least one flow-directing element whereby an angular momentum may be imparted to the liquid flowing through the inlet valve.

2. The swirl element according to claim 1, wherein the swirl element comprises a support structure,
    wherein the support structure is formed over its entire length along the center axis of the swirl element to be substantially cylindrical or pipe-shaped;
    wherein the at least one flow-directing element is arranged on an outer peripheral surface and/or on an inner surface of the support structure; and
    wherein the pitch of the flow-directing element decreases in a downstream direction across a portion that is in contact with a flow.

3. The swirl element according to claim 1, wherein the at least one flow-directing element includes a range of about 15 degrees up to several turns about a support structure.

4. A swirl element according to claim 1, wherein the liquid is one of a mash, a wort, a yeast suspension, a sparge water, a last wort, or a blending water.

5. A swirl element according to claim 1, wherein the brewing vessel is one of a mash tun, a mash vat, a combined mash/wort tun, a combined mash/wort/stripping tun, a wort tun, a combined whirlpool tun, a whirlpool, a clarifying device, or an evaporating vessel.

6. A swirl element according to claim 3, wherein the at least one flow-directing element includes a range of about half a circumference of the support structure.

* * * * *